United States Patent
Shin et al.

(10) Patent No.: US 6,560,498 B1
(45) Date of Patent: May 6, 2003

(54) FORMATION METHOD AND DEVICE FOR CURVED PLATES

(76) Inventors: Jong Gye Shin, Samchang Golden Village 105-108, Banpo-4 Dong 586-3, Seocho-ku, Seoul 137-044 (KR); Won Don Kim, Samho Garden Apt., 2-1204 Woo-2 Dong 1104-1, Haewoondae-ku, Pusan 612-022 (KR)

( * ) Notice: Subject to any disclaimer, the term of this patent is extended or adjusted under 35 U.S.C. 154(b) by 0 days.

(21) Appl. No.: 09/623,228

(22) PCT Filed: Mar. 2, 1999

(86) PCT No.: PCT/KR99/00093

§ 371 (c)(1),
(2), (4) Date: Aug. 30, 2000

(87) PCT Pub. No.: WO99/44764

PCT Pub. Date: Sep. 10, 2000

(30) Foreign Application Priority Data

Mar. 5, 1998 (KR) .............................. 98-7332

(51) Int. Cl.[7] .................. G06F 19/00; G05B 13/02; G06G 7/48; B63B 9/00
(52) U.S. Cl. .................... 700/97; 700/48; 700/104; 700/150; 702/42; 703/1; 703/7; 114/65 R
(58) Field of Search .............. 700/48, 95–98, 700/104, 117, 150; 702/42; 703/1, 7; 114/65 R, 79 R

(56) References Cited

U.S. PATENT DOCUMENTS

| | | | |
|---|---|---|---|
| 4,598,420 A | * 7/1986 | Harvey | 348/88 |
| 5,608,842 A | * 3/1997 | Broese et al. | 700/37 |
| 6,009,378 A | * 12/1999 | Tang et al. | 700/127 |
| 6,035,242 A | * 3/2000 | Uemura et al. | 264/40.1 |
| 6,157,900 A | * 12/2000 | Maseeh | 703/1 |
| 6,224,249 B1 | * 5/2001 | Ozawa et al. | 700/161 |
| 6,415,191 B1 | * 7/2002 | Pryor | 700/95 |

* cited by examiner

*Primary Examiner*—Leo Picard
*Assistant Examiner*—Elliot Frank
(74) *Attorney, Agent, or Firm*—Antonelli, Terry, Stout & Kraus, LLP

(57) ABSTRACT

This invention includes the generation of forming information and its manipulation scheme as a method to form curved plates in ship hull-pieces. This invention consists of three components as follows: one is to construct and utilize a database which includes data about flat plates, objective curved plates, plates which are being formed, and their forming information, another is to infer new forming information with an artificial neural network system, and the third is to obtain forming information through calculating in-plane and bending strains. In the third, initial forming information is obtained by calculating strains from relationship between flat plates and objective curved plates. And new forming information is yielded through calculating the strains from relationship between partially formed curved plates and objective curved plates. Final objective plate are reached by repeatedly performing the measurement of the difference between plates in the proceeding steps and final objective plates and the calculation of the new strains in each process. Therefore, through this invention standardization and automation can be realized in the formation of curved plates.

8 Claims, 3 Drawing Sheets

FORMATION METHOD AND DEVICE FOR CURVED PLATES

TECHNICAL FIELD

This invention relates to a formation method and device for curved plates.

BACKGROUND ART

Generally, two methods are being widely used in forming ship hull pieces: hot forming and cold forming. Since mechanical cold forming can be easily controlled using a press or a roller, it is mainly used as a method to form slightly curved plates or simple plates with constant curvature overall their area and as a preceding method for forming doubly curved plates. Hot forming method, which uses residual thermal elastic-plastic deformation to be caused in heating, is mainly used as a second method to form doubly curved plates or a method to remove residual welding deformation in ship blocks.

The hot forming method has been called a line-heating process as plates are heated in a constant direction. This line-heating process needs a lot of forming information such as heating positions, heating speed, cooling positions, cooling speed, etc. In the former process, skillful workers have decided this forming information. Worse, some technical systems and databases have not yet been built in relation with this process.

To simulate mechanism of line-heating process and to systematically provide forming information, some 3-dimensional thermal elastic-plastic analyses have been studied and published. However, such methods are not adequate and practical in production shops due to extensive calculations and time.

Some researchers have been conducted to improve this defect. They are roughly divided into two categories. One category is to derive a simple formula from the relationship between heat input and the corresponding residual deformation, which is obtained from experimental data. This has advantages in reducing time when compared with the thermal elastic-plastic analysis. The other category is to use a simple model in the thermal elastic-plastic analysis. Recently, some models with a simplified analysis to improve an initial beam model have been developed; including a 2-dimensional strip model, a 2-dimensional elastic-plastic theory for a round plate under spring constraint, and a modified strip model. This approach has some difficulties in assuming the accurate structural behavior and consuming much time in practically simulating the line-heating process.

Moreover, simplified formula and simplified analyses have fatal faults in offering exact forming information since shrinkage. In other words, the in-plane strain is not taken into consideration, even though the arbitrary curved plates have both in-plane strains and bending strains that are indispensably yielded in the forming process. If only bending strains are considered in generating the forming information, the basic errors cannot be resolved.

Formerly, forming information has been also obtained only from the relationship between flat plates and their objective curved plates. The objective curved plates are formed through some stages. Such former methods have not considered these stages to again form the plates which are partially formed into the objective curved plates. As a result, the practical line heating process cannot be realized.

Though forming information was obtained on basis of an inaccurate theory or was generated by intuition of the skillful workers, a systematic database has not been built relating to such forming information. An information model must be examined on this manufacturing process as closely as possible. However, such information model has not been investigated until now. Consequently, little data is known and has never been used.

Conclusively, in former techniques for the formation of curved plates, forming information depends on workers' experiences, and is subject to errors due to its inaccurate bases, and its flow has not been examined and its manipulation has not been systematic. That is, there is no known technique used to obtain computerized and structured data from the existing forming information.

DISCLOSURE OF THE INVENTION

In this invention, it is intended to improve the productivity in shipbuilding and automate a formation process of curved plates, specially, a line-heating process by establishing a new forming process to make better curved plates in which inexact forming information is used only considering bending strain and developing some techniques corresponding to this process. Such techniques are divided into two methods: one is a component technique to yield accurate forming information and the other is a system technique to utilize the information efficiently.

This invention is intended to provide workers with accurate forming information and to form curved plates more close to their objectives specially in the hot forming process, e.g., line-heating in which curved plates are formed by locally heating one side of plates with a torch. Moreover, this invention automates the forming process. Such purposes are accomplished by constructing a database on various data and forming information systematically, which are previously obtained by workers through experiences, by inferring new information from this database through the artificial neural network method, and by calculating in-plane and bending strains from relationship between initial flat plates or any initially-curved plates and their objective plates.

This invention adopts three main component techniques to obtain accurate forming information. One is to calculate in-plane and bending strains. Another is to simulate the formation process of curved plates by developing a numerical mode. And the third is to calculate and infer the forming information.

To efficiently utilize forming information produced through these three techniques in practical manufacturing, this invention includes the following techniques:

- to computerize the formation process of ship hull pieces systematically,
- to establish its product model on a basis of the object-oriented concept to integrate various data,
- to build a product database on a basis of this product model, and
- to provide new information to form the plates which is partially formed into their objective curved plates. This new information helps plates to converge to their objectives.

According to one aspect of this invention, there is provided a ship hull-piece forming method comprising the steps of: (a) constructing a product database by using a relational database management system and by building product model on a basis of information modeling about formation data and processes; (b) measuring the shape of a plate and processing data; (c) performing numerical analyses on a basis of thermal elastic-plastic theory, which have forming information on the above measured plate and information on heating position as an off-line training or programming; (d) inferring forming information that is applied to new plates with multiplayer artificial neural network from the product database which includes data obtained by numerical simulations and measured in the previous works; and (e) generating information on heating paths and heat condition by calculating in-plane and bending strains from relationship between flat plates and the objective curved plates and from relationship between the objectives and plates partially formed in the middle of formation; wherein the difference between any shaped plate partially formed in the middle of formation and their objective plates can be measured during the process and the in-plane and bending strains can be numerically calculated based on that difference to provide the forming information; and wherein the formation step is completed by repeatedly making this measurement and calculation at each processing step.

According to another aspect of this invention, there is provided the ship hull-piece forming method having abilities of offering forming information to workers through monitors and worksheets, sending the forming information to the automatic device for line-heating process, and storing intermediate forming information from this device to the product database.

According to another aspect of this invention, the information-generating step (e) has abilities of providing heating paths for the transverse formation, which are determined perpendicularly to maximize principal directions of bending strains by calculating the ratio between maximum principal bending strains and minimum ones, and providing heating paths for the longitudinal formation, which are determined perpendicularly to maximum principal directions of in-plane strains by calculating the ratio between maximum principal in-plane strains and minimum ones.

According to another aspect of this invention, the numerical analysis step (c) comprises steps of (c-1) setting up parameters such as sizes of plates, initial curvature of plates, speed of a torch, the clearance between a torch and a cooler, film coefficient, the number of finite elements; (c-2) setting up material properties like condition coefficient and specific heat quality, to model a heat source and a cooling method, calculating temperature distribution in each time step, and making post-process to show the calculating results effectively; and (c-3) setting up material properties like conduction coefficient, elastic coefficient, thermal expansion coefficient, yield stress, determining boundary conditions, calculating strains and stresses with temperature distribution, and making post-processing to effectively show calculating results.

According to another aspect of this invention, the database-construction step (a) has a relational product database and having steps of (a-1) information modeling containing the flow of data in formation process of ship hull-pieces on a basis of the object-oriented concept; (a-2) definition of product model about formation process of ship hull-piece on a basis of the object-oriented concept, in which product model data cover all information over total life cycle—design, production and waste—of specific product such as phase 1, phase 2, phase 3, and phase 4 wherein the phase 1 is the selection of objects that is Hull piece and kinematics, Bending strain and in-plane strain, Principal curvature and piece forming method, Rolling and rolling condition, Line-heating and heating condition, Material property and NURBS surface, Offset table and surface measuring, Measuring points and measuring sequence, Heating line set and heating sequence, and Communication method and ANN model, the phase 2 is the definition of their attributes and their relationship, the phase 3 is the setup of their constraints, and the phase 4 is the model integration of these objects; and (a-3) construction of the product database which some forming information is saved to and retrieved from on a basis of such product model.

According to another aspect of this invention, there is provided an information-generation system for ship hull-piece formation comprising a measurement module in which the shape of plates in process and forming information is measured with some devices; a numerical analysis module in which heating conditions are calculated and verified, and this process is simulated, using a numerical program for thermal elastic-plastic analysis; a display module in which information is displayed in a monitor of a personal computer (PC) and is printed out through a printer; a data access module in which measuring and forming information is stored to and retrieved from a product database and a STEP physical file that has measuring and forming information is available; an inference module in which forming information and heating conditions about a plate to newly form are predicted from data of the product database by an artificial neural network method; an information-generating and control module in which each module previously described is controlled by a program of this module and forming information is obtained through calculation of in-plane and bending strains in the processing stages, wherein heating paths or locations to heat on are determined, comparing in-plane strains and bending strains with each other; a communication module through which the information-generating and control module transmits forming information, heating conditions and heating paths to numerical control machine based on PC (PC/NC) and through which the measured and the formation results are transmitted and stored to the product database.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

BEST MODE FOR CARRYING OUT THE INVENTION

Figure 1:
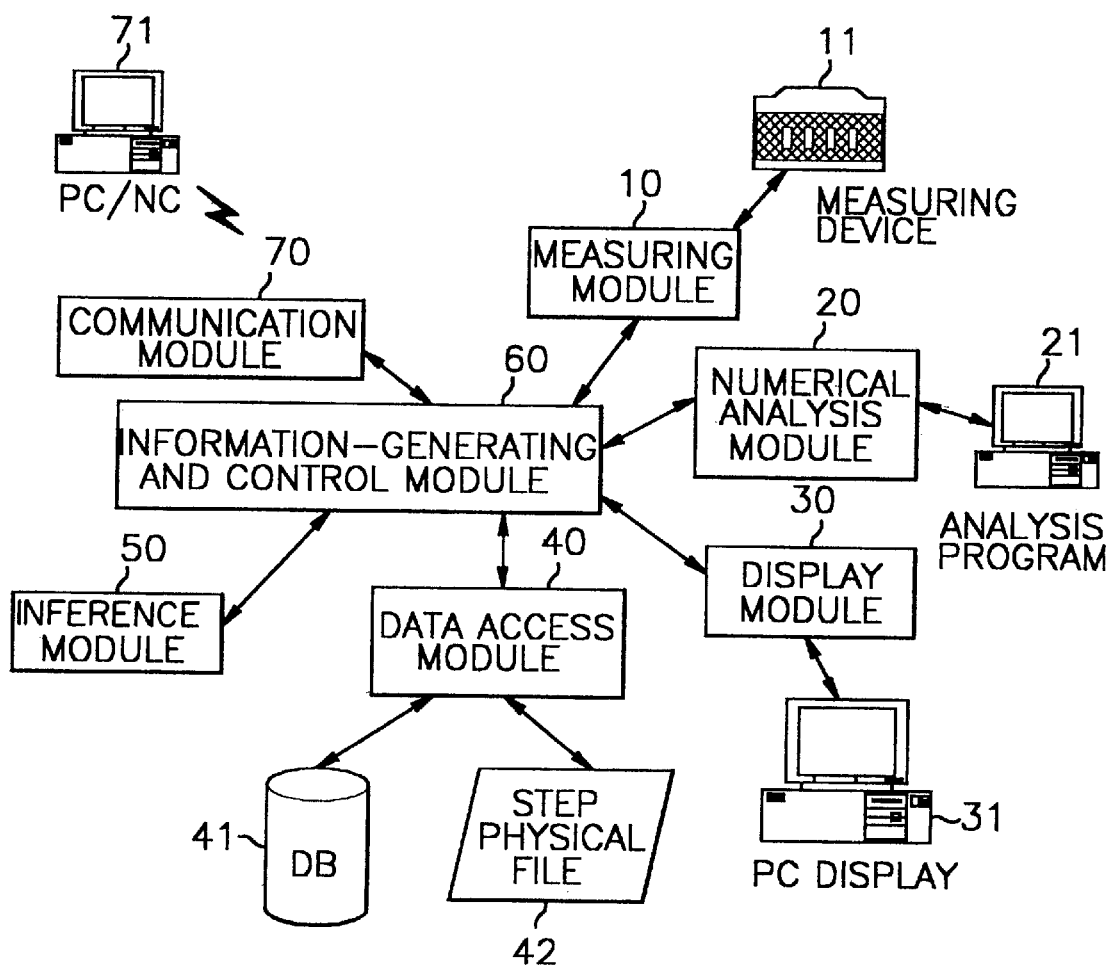
FIG. 1 is a diagram which shows the system of a formation method of curved plates according to an embodiment of the present invention.

FIG. 1 is a diagram which shows the system of a formation process of curved plate according to an embodiment of the present invention. As shown in FIG. 1, this formation process is composed of seven parts: a main module and six sub-modules. In the measurement module (10), the shape of plates in process and forming information is measured with a device (11). In the numerical analysis module (20), heating conditions are calculated and verified, and this process is simulated, using a numerical program (21) for thermal elastic-plastic analysis. In the display module (30), forming information is displayed in a monitor of a personal computer (PC) (31) and is printed out through a printer. In the data access module (40), forming information is stored in a product database (41) and subsequently retrieved. A STEP (Standard for the Exchange of Product model data) physical file that has forming information is available. In the inference module (50), forming information and heating conditions about a plate to newly form are predicted from data of the product database by an artificial neural network method. In the information-generating and control module (60), each process previously described is controlled by a program of this module and forming information is obtained through calculation of in-plane and bending strains in the processing stages. Also heating paths or locations are determined, comparing in-plane strains and bending strains with each other. This module (60) transmits forming information, heating conditions and heating paths to numerical control machine (71) based on PC (PC/NC) through the communication module (70). Also through the communication module (70) the measured formation results are transmitted and stored in the product database (41).

Figure 2:
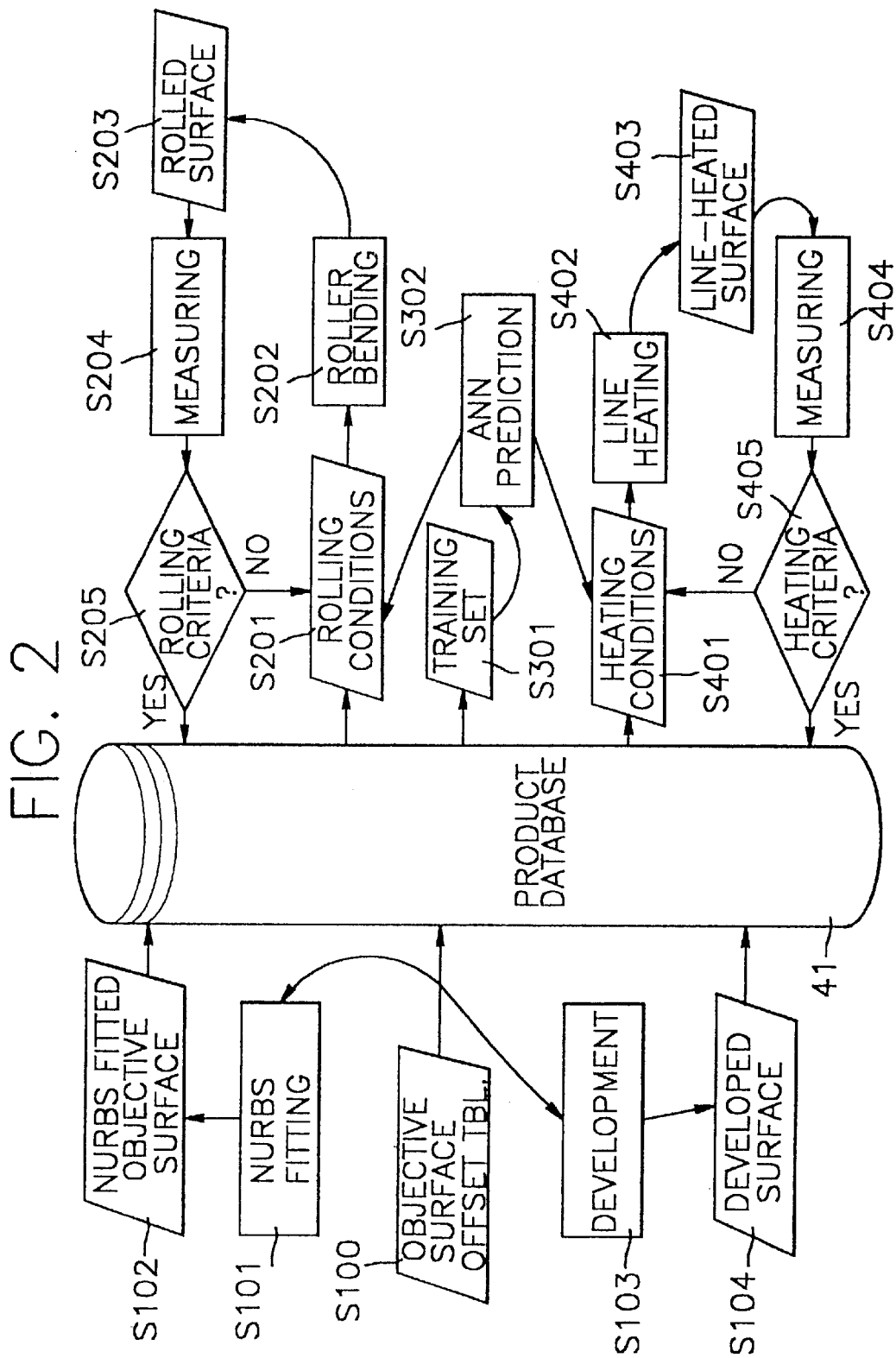
FIG. 2 is a chart which shows information and a manufacturing flow of data production, handling and storage according to an embodiment of the present invention.

FIG. 2 is a chart which shows information and a manufacturing flow of data production, handling and storage according to an embodiment of the present invention. As shown in FIG. 2, this formation process is composed of four sub-processes as follows.

CAD (Computer-Aided Design) process (S100–S104) in which necessary data such as a surface model and expanded shapes are calculated on a basis of objective plates and then are stored in the product database (41)

Roller bending process (S201–S205) in which rolling information such as the rolling quality and the measuring information is retrieved from the database (41), roller bending is implemented, and measured results are stored in the product database (41)

Inference process (S301–S302) in which forming conditions are inferred for roller bending and line heating by an artificial neural network method Line-heating process (S401–S405) in which heating and measuring information are retrieved from the database (41), line-heating is implemented, and measured results are stored in the product database (41)

Offset data of objective plates that are obtained from the ship design step are modeled into NURBS (Non-Uniform Rational B-Spline) surfaces (S101) in order to calculate bending and in-plane strains in this system and then the modeled surfaces are stored in the product database (41)—In the development process (S103), developed shapes of the objective curved plates (S104) are calculated with such data and are also stored in the product database (41).

As the cold forming is adopted as the first process (S201–S205) in forming curved plates, the roller bending is carried out on a basis of rolling information (S201) obtained from relationship between objective plates and their developed plates. And then the bent plates are measured through the measurement module in FIG. 1. Through this measurement, the difference between the bent plates from the designed shapes is obtained. If their shapes are obtained as desired, information that occurs in this process is saved to the database (41) and next process is made.

Line-heating process (S401–S405) can be adopted as the first without roller bending or as the second after roller bending. Therefore, in adopting line-heating as the first process the forming information is determined to fabricate flat plates or plates that has initial curvature (S302)—If the plates are pre-fabricated by the cold forming, the line-heating will be applied to curved plates as the second process. The forming information for line heating (S401) is yielded in the same way as that of roller bearing. That is, it is obtained from relationship between the objective curved plates and the initial plates. After the line heating is completed (S402), the formed plates are measured (S404) and it is evaluated whether the desired shapes are obtained. If the desired shapes are not made, the previous steps are repeated. And the information which occurs in this process is continuously stored in the product database (41).

Inference devices, e.g., an artificial neural network method are adopted to estimate forming information in roller bending and line-heating. In the inference process (S301–S302), the new information is determined through the database (41) in which many data have been accumulated.

Each part of FIG. 1 is implemented by a software in this invention. We can constitute some softwares for each part to do the following steps in accordance with the information-generating and control module (60).

The measuring step in which plates and information are measured through the measurement module (10) at the processing;

The numerical analysis step in which forming information is predicted and verified on a basis of the thermal elastic-plastic theory of the numerical analysis module (20);

The displaying step in which much information and measuring results are viewed in PC monitors (31) through the display module (30);

The data manipulation step in which the designed data of plates and forming information is saved to and retrieved from the product database (41) through the data access module (40);

The inferring step in which new forming information to be applied to new fabrication is predicted from data that exist in the product database (41) by using an artificial neural network method through the inference module (50);

The communication step in which fabrication information is sent from the database (41) to the forming device, or PC/NC machine (71) through the communication module (70) and the proceeded data are transmitted from PC/NC machine (71) to the display module (30) and the data access module (40);

The information-generating step in which bending and in-plane strains are calculated to generate initial forming information and intermediate information, and to decide locations of heating lines through the information-generating and control module (60).

From now on, the steps previously mentioned will be described in details.

(1) The measuring step

Using the measuring devices, the shapes of plates in process and the process information are measured. After that, the above information is inputted into the database (41) through the measurement module (10). The information of the interim shapes during process is used to produce new fabrication information.

(2) The numerical analysis step

To find the fabrication information on heating paths, heating velocity, heat input, etc., a numerical analysis is efficient. The plates show a complicated thermal elastic-plastic behavior under line-heating process. To analyze the thermal elastic-plastic problem, the time-dependent temperature distribution of a heated plate is determined. As thermal deformation of a material under heating and cooling is not so large, heat transfer problem and thermal deformation problem can be considered to be uncoupled in this analysis. So, the thermal elastic-plastic problem can be simplified somewhat. During this analysis, material properties such as yield stress, elastic coefficient, thermal expansion coefficient, etc., are dependent on temperature.

Numerical analysis process can be largely categorized into three parts.

In the first step, a numerical mode is composed. It involves the shape information such as sizes and initial curvature of a plate, the forming information such as velocity of a torch, cooling conditions, heat input, etc., and the meshes of the plate that affect on the numerical analysis.

In the second step, the heat transfer problem is solved. In heating, the plate has the temperature distribution caused by the heat conduction in the transverse and longitudinal direction and in cooling, the plate gets cooled only by heat convection ignoring the cooling by radiation.

In this invention the heat source is treated as the shape of Gauss distribution, moving over the plate with fixed velocity. The heat source is modeled as the following equation:

$$q^a(r) = q_{max} e^{-\gamma r^2}$$

where $q^a(r)$ is heat flux, $q_{max}$ is maximum heat flux, $\gamma$ is concentration coefficient, r is a distance from the center of the heat source. Also the cooling process is expressed as convection heat conduction formula as below, known as Newton's law of cooling.

$$q^a_c = h(T_\infty - T_s)$$

where $q^a_c$ is convective heat flux, h is film coefficient, $T_\infty$ is the temperature of a coolant, $T_s$ is the temperature on a surface of the plate. The temperature distribution is found by numerically solving the partial differential equations of this heat conduction problem caused by movement of the distributed heat source.

The third step is the procedure in which the thermal elastic-plastic analysis is preformed with the temperature distribution which is found in the second step. The yield stress of a plate decreases as the temperature of the plate increases. The heated surface has the compressive stress as the surface expands in heating. If this comparative stress gets lower than the yield stress, the material yields locally. Owing to that, the plate has the bending effect during the cooling process. The heated surface has the tensional stress as the surface contracts in cooling.

In the first step previously described, various parameters are established. These parameters involves the size of the plate, the initial curvature of the plate, the velocity of the torch, the distance between the torch and the cooling device, film coefficient, the number of the finite element, etc.

As the second step previously described, four procedures are performed in the heat conduction problem. The first is setting the conduction coefficient and specific heat quantity. The second is modeling the plate, a torch, and a cooling. The third is calculating the temperature distribution in each time step. And the fourth is post-processing which shows the results efficiently.

As the third step previously described, four procedures are also performed in the thermal elastic-plastic problem. The first is setting up the material properties like the transfer coefficient, the elastic coefficient, the thermal expansion coefficient, the yield stress, etc. The second is applying the boundary condition. The third is calculating the deformation and the stress from the temperature distribution which is obtained in the second step. And the fourth is post-processing which shows the calculation result efficiently.

(3) The displaying step

This is the step of showing determined information through a monitor.

(4) The data manipulation step

In this step, we build and use the design data on the shapes of curved plates and the forming information. The information contains measuring values and the results of the numerical analysis. For that, this invention carries out a information modeling using an object oriented concept in the forming process on ship hull pieces and defines a product data model. This product model defines all information generated during a whole lifetime from the design and production of a specified product to the waste. Using a relational database management system (RDBMS), we build the database on a basis of the product model of a ship hull plate. The necessary objects are defined and the database is organized with these objects. The principal objects are as follows:

Hull piece, Kinematics,

Bending strains, In-plane strains,

Principle curvature, Piece forming method,

Rolling, Rolling condition,

Line-heating, Heating condition,

Material property, NURBS surface,

Offset table, Surface measuring,

Measuring points, Measuring sequence,

Heating line set, Heating sequence,

Communication method, ANN model.

A product database, shown in FIG. 2, is constructed on the basis of the definition and constraints of the attributes and relationships of these objects.

(5) The inferring step of the forming information

The fabrication information can be obtained though a multilayer artificial neural network (ANN) with a back-propagation algorithm, which requires the information database built by the simulation of the numerical analysis and the measurement. The ANN consists of the input layers, the hidden layers and the output layers.

$$Q = \sum_{i=1}^{n} I_i w_i$$

$$R = f(Q)$$

where $I_i$ are the values of the input layers, Q is the value of the hidden layers, R is the value of output layers, $w_i$ are the weights, and f is the active function. For the active function f, the sigmoid function is adopted as follows.

$$f(Q) = 1/(1+e^{-Q})$$

And the next equation is valid to control the weights.

$$w_i^n = w_i^0 + \eta \times \delta \times R$$

$$\delta = f' \times (T-R)$$

where $w_i^n$ are updated values of the weights, $w_i^0$ is the old values of the weights, R is the output values of the correspondent variables, $\eta$ is the training rate, f' is the derivative of the active function f, and T is the target value. The training rate $\eta$ is a constant between 0.01 to 1.0.

In the case of the sigmoid function as f, f' is simply obtained as f'=R(1−R). After the weights are controlled in the connection between the hidden layers and the output layers, the weights between the hidden layers and the input layers are also controlled in the similar way. And then, with the newly updated weights, ANN system calculates the output. If that result is within the tolerance range, it ceases the training, but if not, continues the training until the accuracy of output enters the tolerance range.

In this invention, the training is performed with the variation in the number of the hidden layers and of neurons in each hidden layer. From the results, if ANN system has enough neurons in two hidden layers, it studies the example problems with ease. The inference from the training gives reasonable solutions, which presents relatively small error. This means that when the rich data sets are examined and trained in the problem domain, the ANN system will serve the results close to the real practice. And it will efficiently utilize the results of the structural analysis.

To verify this possibility, examples are shown for the implementation of the numerical analyses and the inference of new information. The numerical analyses are performed with variation of the thickness, initial curvature of plates and the moving speed of the heating torch. When the results of the examples are regarded as the training set, ANN system infers the maximum deformation for new inputs.

In Table 1, the results of numerical analyses are shown. The input values are initial curvature and thickness of plates, and the output value is deformation.

TABLE 1

| Initial curvature (ρ:mm) | Thickness (t:mm) | Speed of torch (s:mm/sec) | Maximum deflection (δ:mm) |
| --- | --- | --- | --- |
| 1000 | 20 | 7.5 | 3.654 |
| 1000 | 20 | 10 | 2.413 |
| 1000 | 20 | 12 | 1.917 |
| 1000 | 25 | 10 | 1.958 |
| 1000 | 25 | 12 | 1.71 |
| 2000 | 20 | 7.5 | 3.328 |
| 2000 | 20 | 10 | 2.465 |
| 2000 | 20 | 12 | 2.04 |
| 2000 | 25 | 7.5 | 2.169 |
| 2000 | 25 | 10 | 1.981 |
| 3000 | 20 | 7.5 | 3.219 |
| 3000 | 20 | 10 | 2.471 |

With respect to the radius of initial curvature, thickness and the speed of torch, the two following cases give the maximum deformations inferred by the ANN system in Table 2.

TABLE 2

| ρ | t | s | δ (exact) | δ (1) | δ (2) |
| --- | --- | --- | --- | --- | --- |
| 1000 | 25 | 7.5 | 2.406 | 2.56 (+6.4%) | 2.868 (+19.2%) |
| 2000 | 25 | 11 | 1.89 | 1.896 (+0.33%) | 1.838 (−2.75%) |

In this table, (1) is obtained from the ANN system with 2 hidden layers and 4 neurons in each layer and the training is performed 162900 times. (2) is done with the system with 2 hidden layers, 6 neurons in each layer and 227700 times training.

As seen in Table 2, when the number of neurons increases in each layer, the time needed for training also increases with the remarkable error. This means that adequate number of hidden layers and neurons should be selected with caution.

(6) The communication step

TCP/IP is adopted as a protocol for the communication of manufacturing data between physical devices and the database management system. This is currently being used as an internet protocol.

(7) The information-generating step

Strains are adopted as a primary factor to determine the heating paths and forming conditions to apply initial plates. In this step, such fabrication information is generated through the calculation of in-plane and bending strains. The Green-Lagrangian strain tensor is in main use as follows.

$$\varepsilon_{ij} = \frac{1}{2}\left(\frac{\partial u_i}{\partial x_j} + \frac{\partial u_j}{\partial x_i} + \frac{\partial u_k}{\partial x_j}\frac{\partial u_k}{\partial x_i}\right)$$

where $\epsilon_{ij}$ is the strains and $u_i$ means the deformation in x, y, and z direction.

Figure 3:
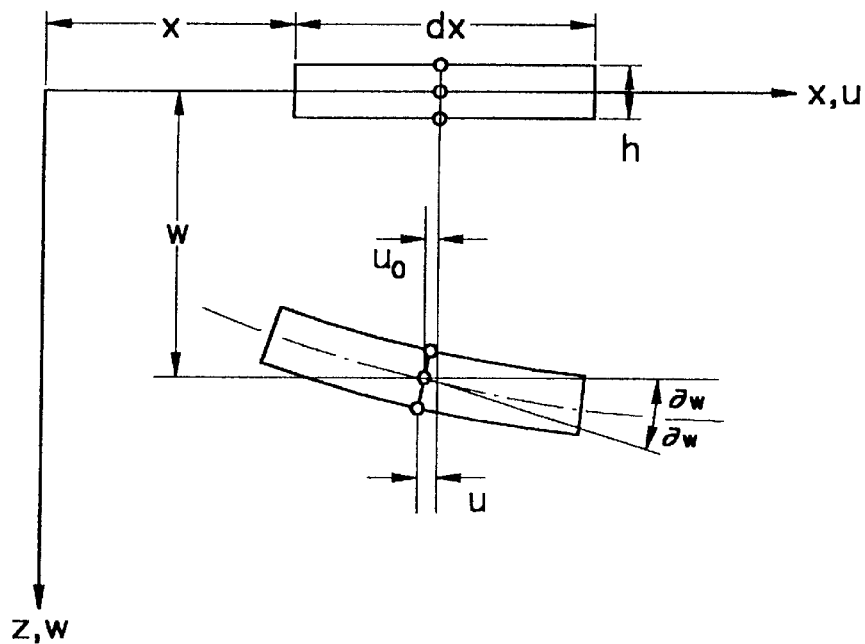
FIG. 3 is a diagram which shows a method to generate forming information from any flat plate according to an embodiment of the present invention. In other words, this is kinematics between any flat plate and the corresponding objective plate.

The method 1 is shown about the information generation for flat plates in FIG. 3, which shows kinematics between any flat plate and the corresponding objective plate.

When you consider an infinitesimal element h(x,y)dxdy in FIG. 3, the corresponding strains are formulated as, $$\varepsilon_{xx} = -z\frac{\partial^2 w}{\partial x^2} + \frac{\partial u}{\partial x} + \frac{1}{2}\left(\frac{\partial w}{\partial x}\right)^2,$$

$$\varepsilon_{yy} = -z\frac{\partial^2 w}{\partial y^2} + \frac{\partial v}{\partial y} + \frac{1}{2}\left(\frac{\partial w}{\partial y}\right)^2,$$

$$\varepsilon_{xy} = -z\frac{\partial^2 w}{\partial x \partial y} + \frac{1}{2}\left(\frac{\partial u}{\partial y} + \frac{\partial v}{\partial x} + \frac{\partial w}{\partial x}\frac{\partial w}{\partial y}\right)$$

When the total strain tensor is denoted by $\epsilon$, $$\epsilon = \epsilon^b + \epsilon^m.$$

The total strains are divided into the bending strains $\epsilon^b$ and in-plane strains $\epsilon^m$.

The in-plane strains are obtained by $$\varepsilon_{xx}^{ni} = \frac{\partial u}{\partial x} + \frac{1}{2}\left(\frac{\partial w}{\partial x}\right)^2,$$

$$\varepsilon_{yy}^{ni} = \frac{1}{2}\left(\frac{\partial u}{\partial y} + \frac{\partial v}{\partial x} + \frac{\partial w}{\partial x}\frac{\partial w}{\partial y}\right)^2,$$

$$\varepsilon_{xy}^{ni} = \frac{\partial u}{\partial y} + \frac{1}{2}\left(\frac{\partial w}{\partial y}\right)^2.$$

And the bending strains are by $$\varepsilon_{xx}^b = -z\frac{\partial^2 w}{\partial x^2}, \quad \varepsilon_{xy}^b = -z\frac{\partial^2 w}{\partial x \partial y}, \quad \varepsilon_{yy}^b = -z\frac{\partial^2 w}{\partial y^2}.$$

Figure 4:
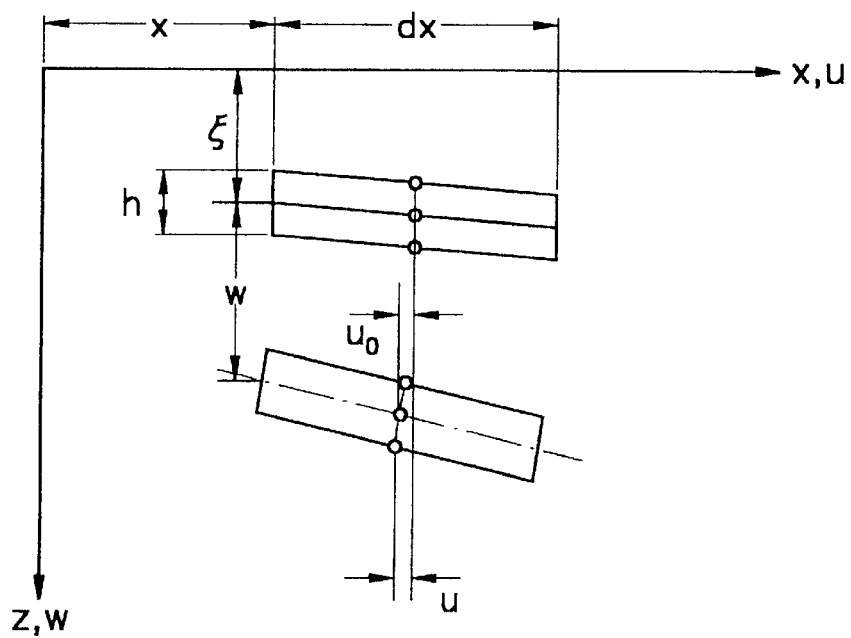
FIG. 4 is a diagram which shows a method to generate forming information from any partially-formed plate according to another embodiment of the present invention. In other words, this is kinematics between any initially-curved plate and the corresponding objective plate.

Also, the information generation for partially formed plates, namely the plates which are initially deflected is shown as the method 2 in FIG. 4, which is kinematics between any initially-curved plate and the corresponding objective plate.

When we consider an infinitesimal element h(x,y)dxdy with initial shape ξ, which occurs by the partial fabrication in FIG. 4, the corresponding strains are obtained as, $$\varepsilon_{xx} = \frac{\partial u}{\partial x} + \frac{1}{2}\left(\frac{\partial w}{\partial x}\right)^2 + \frac{\partial \xi}{\partial x}\frac{\partial w}{\partial x} - z\frac{\partial^2 w}{\partial x^2}.$$

$$\varepsilon_{xy} = \frac{1}{2}\left(\frac{\partial u}{\partial y} + \frac{\partial v}{\partial x} + \frac{\partial w}{\partial x}\frac{\partial w}{\partial y} + \frac{\partial \xi}{\partial y}\frac{\partial w}{\partial x} + \frac{\partial \xi}{\partial x}\frac{\partial w}{\partial y}\right) - z\frac{\partial^2 w}{\partial x \partial y}$$

$$\varepsilon_{yy} = \frac{\delta v}{\delta y} + \frac{1}{2}\left(\frac{\delta w}{\delta y}\right)^2 + \frac{\delta \xi}{\delta y}\frac{\delta w}{\delta y} - z\frac{\delta^2 w}{\delta y^2}$$

Total strain tensor $\epsilon$ is obtained, adding two strain tensors $\epsilon^m$ and $\epsilon^b$ like the case of the flat plate.

$$\epsilon = \epsilon^b + \epsilon^m.$$

So it is seen that $\epsilon_{ij}$ represent components of the strains, divided into in-plane strains $\epsilon_{ij}^m$ and bending strains $\epsilon_{ij}^b$.
In-plane strains are demoted by $$\varepsilon_{xx}^{ni} = \frac{\delta u}{\delta x} + \frac{1}{2}\left(\frac{\delta w}{\delta x}\right)^2 + \frac{\delta \xi}{\delta x}\frac{\delta w}{\delta x}$$

$$\varepsilon_{xy}^{ni} = \frac{1}{2}\left[\frac{\delta u}{\delta y} + \frac{\delta v}{\delta x} + \frac{\delta w}{\delta x}\frac{\delta w}{\delta y} + \frac{\delta \xi}{\delta y}\frac{\delta w}{\delta x} + \frac{\delta \xi}{\delta x}\frac{\delta w}{\delta y}\right]$$

$$\varepsilon_{yy}^{ni} = \frac{\delta v}{\delta y} + \frac{1}{2}\left(\frac{\delta w}{\delta y}\right)^2 + \frac{\delta \xi}{\delta y}\frac{\delta w}{\delta y}$$

and bending strains are by $$\varepsilon_{xx}^b = -z\frac{\delta^2 w}{\delta x^2} \quad \varepsilon_{xy}^b = -z\frac{\delta^2 w}{\delta x \delta y} \quad \varepsilon_{yy}^b = -z\frac{\delta^2 w}{\delta y^2}.$$

The effect of the initial deflection appears in terms of $\xi$ in the in-plane strains. The strains can be calculated numerically on a basis of derived equations in each method. Bending strains represents curvatures at that point. Thus, they can be replaced with the curvature of the interpolated surface. And in-plane strains can be calculated by an isoparametric finite element formulation. In this formulation, a plate element is utilized for obtaining in-plane strains.

After obtaining such in-plane strains and bending strains, the forming information like heating paths and heating order, etc., is determined. Firstly, the ratio of the maximum bending strains and the minimum bending strain is calculated and then heating paths for the transverse formation are determined perpendicular to maximum principal bending strains. Secondly, the ratio of the maximum in-plane strain and the minimum in-plane strain is calculated, and then heating paths for the longitudinal formation are determined perpendicular to maximum principal in-plane strains.

In this step, we construct a forming technique to reduce the errors that naturally occurs in the formation process by repeatedly calculating new forming information from the relationship between the objective curved plates and intermediately formed plates. As previously described, the formation process of ship hull pieces according to the present invention is provided with a database with forming information, inferred new information by an artificial neural network system, in order to fabricate the optimal plates by continuously comparing with the objectives during process.

So it can be possible to fabricate a flat plate into the correspondent objective even if best workers are not available and all processes can be automated in the formation of ship hull pieces.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A ship hull-piece forming method comprising:
   (a) constructing a product database by using a relational database management system and by building a product model on a basis of information modeling about formation data;
   (b) measuring the shape of a plate and process information;
   (c) performing numerical analyses on a basis of thermal elastic-plastic theory, which have forming information on the measured plate and information on heating position as an off-line training or programming;
   (d) inferring forming information to be applied to the plate obtained through an artificial neural network based on data obtained by numerical simulations and measured from previous works; and
   (e) generating information on heating paths and heat conditions by calculating in-plane and bending strains from the relationship between the plate and an objective curved plate and from the relationship between the objective curved plate and the plate partially formed in the middle of formation;
   wherein the difference between any shaped plate partially formed in the middle of formation and the objective curved plate is measured during the process, and the in-plane and bending strains are numerically calculated based on that difference to provide the forming information; and
   wherein formation is completed by repeatedly making measurement and calculation at each processing step.

2. The ship hull-piece forming method according to claim 1, further comprising a step of offering forming information to workers through monitors and worksheets, sending the forming information to an automatic device for line-heating process, and storing intermediate forming information from the automatic device to the product database.

3. The ship hull-piece forming method according to claim 1, wherein said information-generating step (e) has abilities of providing heating paths for the transverse formation, which are determined perpendicularly to maximum principal directions of bending strains by calculating a ratio between maximum and minimum principal bending strains, and providing heating paths for the longitudinal formation, which are determined perpendicularly to maximum principal directions of in-plane strains by calculating a ratio between maximum and minimum principal in-plane strains.

4. The ship hull-piece forming method according to claim 1, wherein said numerical analysis step (c) comprising steps of:
   (c-1) setting up parameters such as the size of the plate, an initial curvature of the plate, a speed of a torch, the clearance between the torch and a cooler, a film coefficient, and a number of finite elements;
   (c-2) setting up material properties such as a conduction coefficient and a specific heat quality, to model a heat source and a cooling method; calculating temperature distribution in each time step; and making post-process to show calculating results; and
   (c-3) setting up material properties such as a conduction coefficient, an elastic coefficient, a thermal expansion coefficient, a yield stress; determining boundary conditions; calculating strains and stresses with temperature distribution; and making post-processing to show the calculating results.

5. The ship hull-piece forming method according to claim 1, wherein said database-construction step (a) comprises:

(a-1) information modeling containing the flow of data in a formation process of a ship hull-piece on a basis of an object-oriented concept;

(a-2) definition of the product model about the formation process of the ship hull-piece on a basis of the object-oriented concept, in which product model data cover all information over a total life cycle—design, production and waste—of specific product such as phase #1, phase #2, phase #3, and phase #4; wherein phase #1 is the selection of objects, including hull-piece and kinematics, bending strains and in-plane strains, principal curvature and piece forming method, rolling and rolling conditions, line-heating and heating conditions, material property and NURBS surface, offset table and surface measuring, measuring points and measuring sequence, heating line set and heating sequence, and communication method and ANN model phase #2 is the definition of attributes and respective relationship; phase #3 is the setup of constraints; and phase #4 is the model integration of these objects; and (a-3) construction of the product database which the forming information is saved to and retrieved from on a basis of such product model.

6. An information-generation system for ship hull-piece formation comprising:

a measurement module in which a shape of a plate and forming information is measured;

a numerical analysis module in which heating conditions are calculated and verified, using a numerical analysis program for thermal elastic-plastic analysis;

a display module in which forming information is displayed, via a monitor, and is printed, via a printer;

a data access module in which measuring and forming information is stored to and retrieved from a product database and a STEP physical file that has measuring and forming information is available;

an inference module in which forming information and heating conditions regarding the plate are predicted from data of the product database by using an artificial neural network method;

an information-generating and control module in which each module previously described is controlled and is obtained through calculation of in-plane and bending strains in the processing stages, wherein heating paths or locations are determined;

a communication module through which the information-generating and control module transmits forming information, heating conditions and heating paths to a numerical control machine through which the measured and formation results are transmitted and stored to the product database.

7. The information-generation system as claimed in claim 6, wherein the heating paths for transverse formation are determined perpendicularly to maximum principal directions of bending strains by calculating a ratio between maximum and minimum principal bending strains, and the heating paths for longitudinal formation are determined perpendicularly to maximum principal directions of in-plane strains by calculating a ratio between maximum and minimum principal in-phase strains.

8. The information-generation system as claimed in claim 6, wherein the numerical analysis program is executed by:

setting up parameters, including the size of the plate, an initial curvature of the plate, a speed of a torch, the clearance between the torch and a cooler, a film coefficient, and a number of finite elements;

setting up material properties, including a conduction coefficient and a specific heat quality, to model a heat source and a cooling method; calculating temperature distribution in each time step; and making post-process to show calculating results; and setting up material properties, including a conduction coefficient, an elastic coefficient, a thermal expansion coefficient, a yield stress; determining boundary conditions; calculating strains and stresses with temperature distribution; and making post-processing to show the calculating results.

* * * * *